(12) United States Patent
Tanaka

(10) Patent No.: US 7,461,571 B2
(45) Date of Patent: Dec. 9, 2008

(54) VEHICLE STEERING APPARATUS

(75) Inventor: Eiji Tanaka, Kashihara (JP)

(73) Assignee: JTEKT Corporation, Osaka (JP)

( * ) Notice: Subject to any disclaimer, the term of this patent is extended or adjusted under 35 U.S.C. 154(b) by 540 days.

(21) Appl. No.: 11/354,115

(22) Filed: Feb. 15, 2006

(65) Prior Publication Data

US 2006/0131828 A1 Jun. 22, 2006

(51) Int. Cl.
*F16H 35/00* (2006.01)

(52) U.S. Cl. .............................. 74/388 PS; 280/93.514

(58) Field of Classification Search .............. 74/388 PS, 74/492, 493; 280/93.514
See application file for complete search history.

(56) References Cited

U.S. PATENT DOCUMENTS

| | | | | |
|---|---|---|---|---|
| 4,218,933 | A | * | 8/1980 | Allen et al. .................... 74/422 |
| 4,663,980 | A | * | 5/1987 | Narita .......................... 74/422 |
| 5,694,810 | A | * | 12/1997 | Iwasa et al. .................... 74/422 |
| 7,367,421 | B2 | * | 5/2008 | Saito et al. .................. 180/426 |
| 2003/0000766 | A1 | * | 1/2003 | Tatewaki et al. ............ 180/444 |
| 2006/0076180 | A1 | * | 4/2006 | Saito et al. .................. 180/428 |
| 2007/0262530 | A1 | * | 11/2007 | Heo ............................ 277/345 |
| 2008/0006471 | A1 | * | 1/2008 | Nakamura et al. .......... 180/444 |

FOREIGN PATENT DOCUMENTS

| | | |
|---|---|---|
| JP | 56-62281 | 10/1979 |
| JP | 1-167963 | 11/1989 |
| JP | 3-2875 | 1/1991 |
| JP | 4-95882 | 8/1992 |
| JP | 5-54150 | 7/1993 |
| JP | 8-133102 | 5/1996 |
| JP | 10-297504 | 11/1998 |
| JP | 11-078914 | 3/1999 |
| JP | 2005-047341 | 2/2005 |

* cited by examiner

*Primary Examiner*—David M Fenstermacher
(74) *Attorney, Agent, or Firm*—Rabin & Berdo, PC

(57) ABSTRACT

A vehicle steering apparatus comprises a rack shaft, a joint provided at an end of the rack shaft, a stopper for regulating a stroke amount of the rack shaft, and a spacer. The spacer comprises an annular elastic member and an annular metal member. The elastic member comprises an inner annular section fitted on the end of the rack shaft and an outer annular section. The metal member comprises an annular section surrounding an outer periphery of the outer annular section of the elastic member. The outer annular section of the elastic member comprises a projection section projecting farther to the stopper than a first abutment section of the metal member when the stopper does not regulate the stroke amount of the rack shaft.

16 Claims, 6 Drawing Sheets

VEHICLE STEERING APPARATUS

BACKGROUND OF THE INVENTION

1. Field of the Invention

The present invention relates to a vehicle steering apparatus.

2. Description of Related Arts

In rack-and-pinion type steering apparatuses for automobiles, rack shafts are axially moved as a pinion is rotated to steer steering wheel. More specifically, tie rods are respectively connected through ball joints to both ends of a rack shaft supported by a housing. Consequently, each of the tie rods is moved as the rack shaft is axially moved, causing a knuckle arm connected to the tie rod to be rotated.

Generally, spacers are respectively mounted on both ends of a rack shaft. Each of the spacers is abutted on a stopper member made of a metal fixed to a housing at a final end position of a stroke of the rack shaft to regulate the movement of the rack shaft. Proposed as such a spacer is one having a metal annulus supported by a housing of a ball joint through an elastic portion and regulating the axial movement of the rack shaft by the metal annulus being abutted on a stopper member made of a metal (see Japanese Unexamined Utility Model Publication No. 5-54150 U published on Jul. 20, 1993, for example).

When the metal annulus in the spacer is abutted on the stopper member, however, noise due to a collision sound between metals may be produced. In order to reduce the collision sound, a spacer having a buffering section made of a rubber-like elastic material which is abutted on a stopper member provided on the outer periphery of a metal annuls before the metal annulus is abutted on the stopper member (see Japanese Unexamined Patent Publication No. 11-78914 published on Mar. 23, 1999, for example), a spacer having a plurality of recesses opened radially outward arranged in the circumferential direction provided on at least one of side surfaces of a metal annulus and having a buffering section composed of a rubber-like elastic member axially projecting farther than an end surface of the metal annulus in each of the recesses (see Japanese Unexamined Patent Publication No. 10-297504 published on Nov. 10, 1998, for example).

In the configurations exemplified in JP 11-78914 U and JP 10-297504 A, the buffering section tends to spread radially outward when collision with the stopper member. However, the radially outward deformation of the buffering section is not restricted. Therefore, the buffering section is not sufficiently axially compressed and deforms radically outward, so that a buffering effect required to reduce noise may not be reliably exhibited.

The present invention has been made under such a background to provide a steering apparatus that can reliably reduce noise.

SUMMARY OF THE INVENTION

In order to attain the above-mentioned object, in a preferred aspect of the present invention, a vehicle steering apparatus comprises a rack shaft supported by a housing so as to be axially slidable; a joint for connecting an end of the rack shaft and an end of a tie rod; and a stopper for regulating the stroke amount of the rack shaft through a spacer. The stopper and the joint respectively comprising end surfaces opposed to each other. The spacer is held between the end surface of the stopper and the end surface of the joint when the rack shaft is at a final end position of the stroke. The spacer comprising an annular elastic member and an annular metal member. The elastic member comprises an inner annular section fitted in an outer periphery at an end of the rack shaft and an outer annular section. The metal member comprising an annular section surrounding an outer periphery of the outer annular section of the elastic member. The annular section of the metal member comprising a first abutment section that is abuttable on the end surface of the stopper when the stopper regulates the stroke amount of the rack shaft. The outer annular section of the elastic member comprising a projection section which projects farther to the stopper than the first abutment section of the metal member does when the stopper does not regulate the stroke amount of the rack shaft.

According to the aspect of the present invention, when the rack shaft is moved to the final end position of the stroke, the projection section of the elastic member is abutted on the stopper before the first abutment section of the metal member is abutted on the stopper, thereby cushioning a shock. At this time, a radially outward deformation of the projection section is restricted by the annular section of the metal member, thereby making it possible to obtain a high buffering effect by compressing axially the projection section sufficiently. After such a high buffering effect is thus obtained, the first abutment section is abutted on the stopper, so that it is possible to reliably restrain production of a collision sound between metals. The degree at which the shock is cushioned can be easily adjusted only by changing the hardness of the elastic member.

Furthermore, the elastic member is elastically deformable. Therefore, even if the spacer is not previously assembled on the rack shaft with high precision, the spacer can be prevented from being abutted on the stopper with the spacer is inclined toward the stopper. Consequently, time and labor required to enhance the assembling precision of the spacer on the rack shaft can be omitted, thereby making it possible to significantly reduce labor required for the assembling.

DETAILED DESCRIPTION OF THE PREFERRED EMBODIMENT

Preferred embodiments of the present invention will be described while referring to the accompanying drawings.

Figure 1:
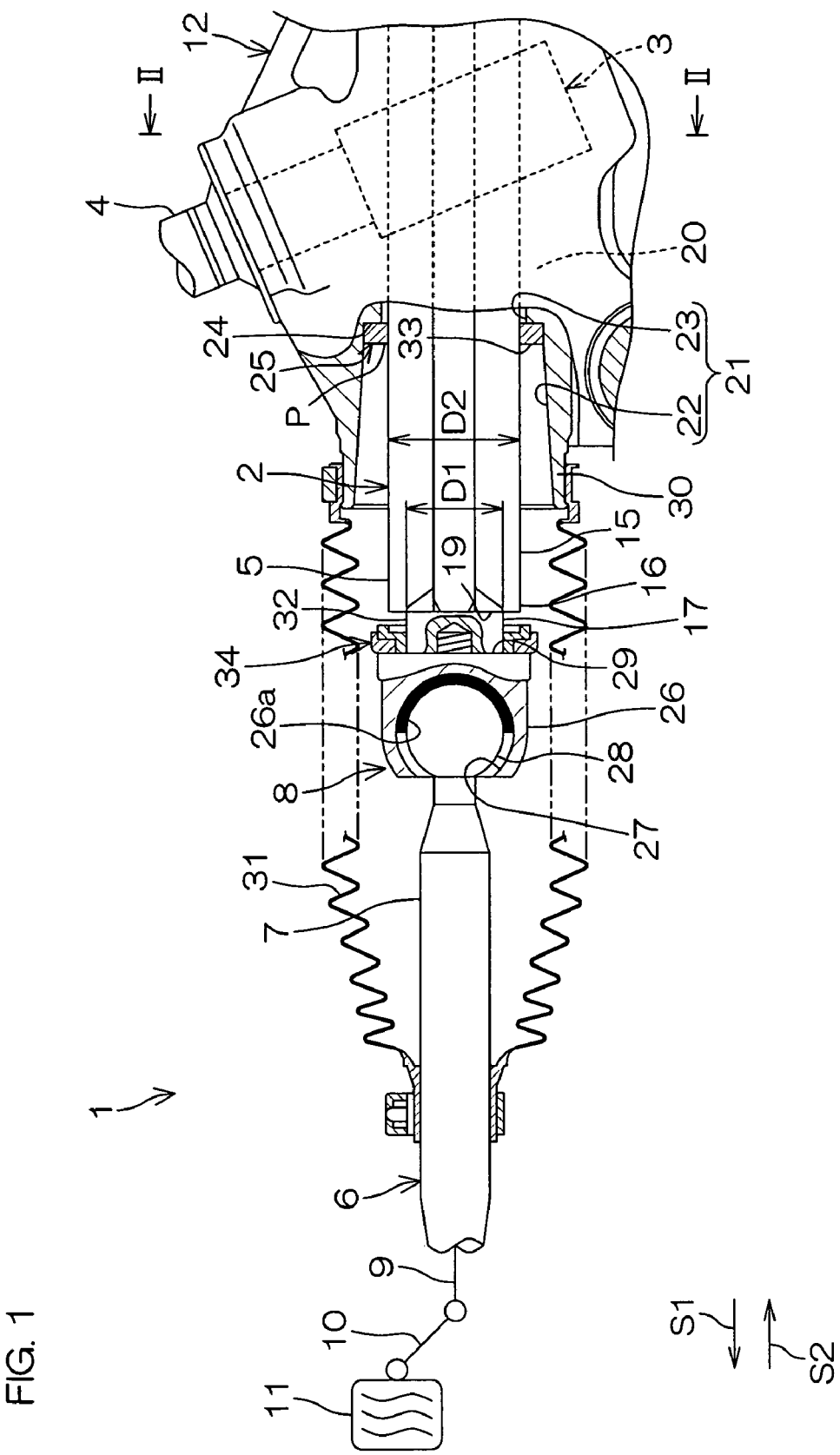
FIG. 1 is a schematic partially broken front view showing the schematic configuration of a steering apparatus according to an embodiment of the present invention.
Figure 2:
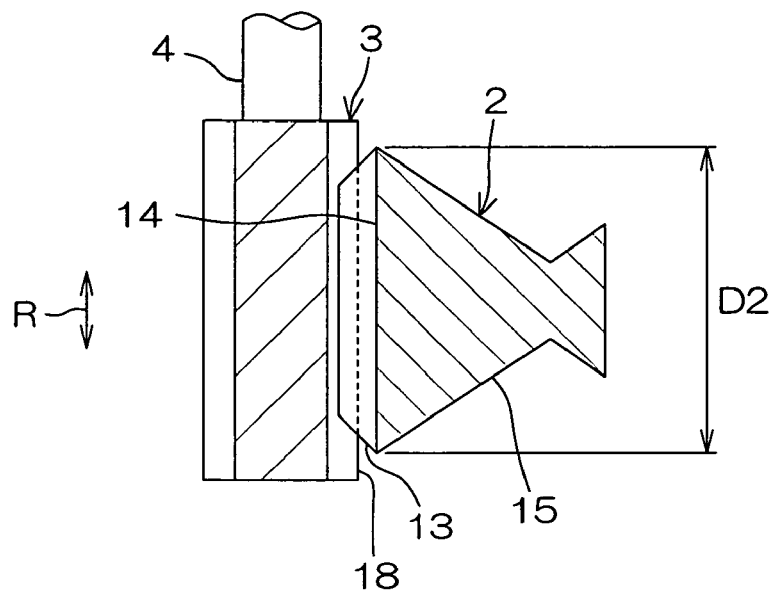
FIG. 2 is a cross-sectional view of a rack shaft and a pinion along a line II-II shown in FIG. 1.

FIG. 1 is a schematic partially broken front view showing the schematic configuration of a steering apparatus 1 according to an embodiment of the present invention. FIG. 2 is a cross-sectional view of a rack shaft 2 and a pinion 3 along a line II-II shown in FIG. 1. Referring to FIG. 1, the steering apparatus 1 comprises a pinion shaft 4 connected to a steering wheel (not shown) so as to be rotatable accompanying to the steering wheel, a rack shaft 2 meshed with a pinion 3 at a front end of the pinion shaft 4, and a housing 12 for supporting the rack shaft 2 so as to be slidable in first and second axial directions S1 and S2 (hereinafter merely referred to as a "first axial direction S1" and a "second axial direction S2").

A ball joint 8 serving as a joint for connecting a pair of ends 5 (only one of the ends 5 is illustrated in FIG. 1) of the rack shaft 2 and one corresponding end 7 of a pair of tie rods 6 (only one of the tie rods 6 is illustrated in FIG. 1) is connected to each of the pair of ends 5 of the rack shaft 2. A wheel 11 is connected to an other end 9 of each of the tie rods 6 through a knuckle arm 10.

By the above-mentioned configuration, when the steering wheel is operated so that the pinion 3 is rotated, the rack shaft 2 is moved in either one of the first and second axial directions S1 and S2 to cause the knuckle arm 10 to be rotated, thereby making it possible to steer the wheel 11.

Referring to FIGS. 1 and 2, the rack shaft 2 comprises a main body section 15 serving as a section, which is in a Y shape in cross section, having on a top surface 14 a rack tooth section 13 meshed with a tooth section 18 of the pinion 3 such that power can be transmitted to the tooth section 18, and a cylindrical section 17 provided at an end 16 of the first axial direction S1 of the rack shaft 2.

The rack tooth section 13 is thus formed on the top surface 14 serving as a plane-shaped portion of the main body section 15, so that a portion where the rack tooth section 13 is meshed with the tooth section 18 of the pinion 3 can be made larger, as compared with the conventional case where a rack tooth section is formed in a rack shaft that is circular in cross section, thereby making it possible to transmit a significantly large torque to the rack shaft 2 from the pinion 3. The cylindrical section 17 projects in the first axial direction S1 from an end surface 19 of the first axial direction S1 of the main body section 15, and a diameter D1 of cylindrical section 17 is set to a value smaller than a vertical width D2 of the main body section 15 (D1<D2).

The housing 12 comprises an accommodation chamber 20 accommodating a front end of the pinion shaft 4, the pinion 3, and a part of the rack shaft 2, and an insertion hole 21, through which the rack shaft 2 is inserted, for communicating an end of the first axial direction S1 of the accommodation chamber 20 and an outer part of the housing 12.

The insertion hole 21 comprises a large-diameter section 22, and a small-diameter section 23 formed of the second axial direction S2 of the large-diameter section 22 and having a smaller diameter than the large-diameter section 22. The large-diameter section 22 is formed in a tapered shape, so that an inner diameter thereof decreases from the first axial direction S1 to the second axial direction S2.

The large-diameter section 22 and the small-diameter section 23 are connected to each other through an annular step 24. An annular stopper 25 made of a metal, through which the rack shaft 2 is inserted, is fixed by press fitting, for example, to an inner peripheral surface of the large-diameter section 22. The stopper 25 is for regulating movement (a stroke) of the rack shaft 2 in the second axial direction S2 through a spacer 34 described later in a state where the cylindrical section 17 in the rack shaft 2 is displaced to a final end position P of the stroke in the second axial direction S2. The stopper 25 is positioned along the axis of the housing 12 by its end surface of the second axial direction S2 being abutted on the annular step 24.

The ball joint 8 comprises a housing section 26 fixed to the cylindrical section 17 of the rack shaft 2, and a spherical section 28 accommodated in the housing section 26 so as to be rotatable and connected to the one end 7 of the tie rod 6 extending into the housing section 26 through an opening 27 in the housing section 26. The spherical section 28 is received by a spherical surface supporting section 26*a* of the housing section 26. The housing section 26 is fixed by screwing a screw projecting from a plane-shaped end surface 29 of the second axial direction S2 into a screw hole of the cylindrical section 17 of the rack shaft 2.

A bellows-shaped boot 31 that can be freely expanded and contracted covers an area between an end 30 of the first axial direction S1 of the housing 12 and an axially intermediate portion of the tie rod 6.

Figure 3:
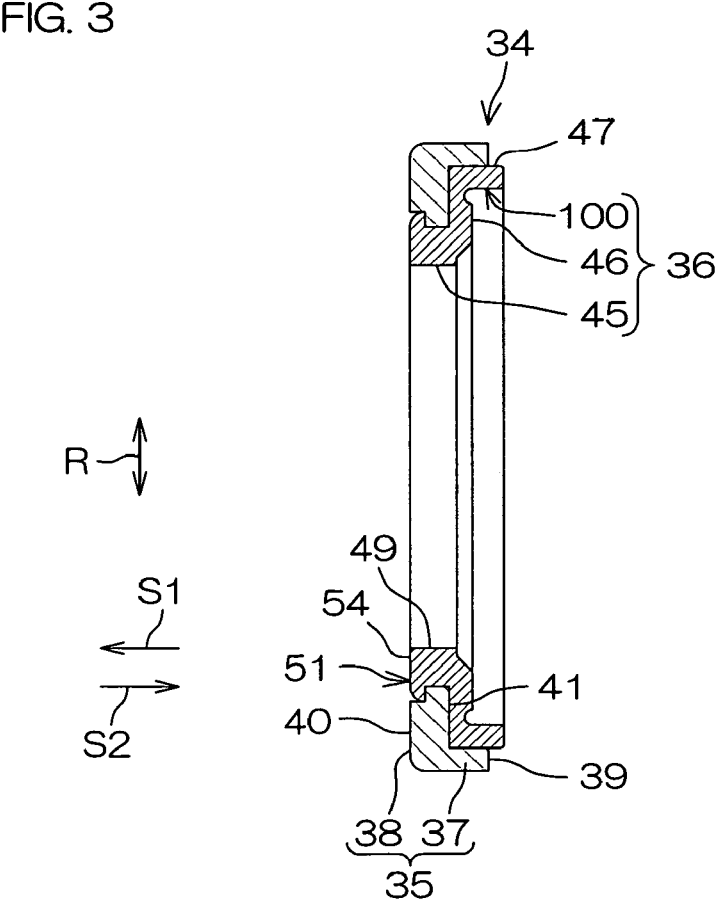
FIG. 3 is a cross-sectional view of a spacer.

A spacer 34 is mounted on an outer peripheral surface 32 of the cylindrical section 17 of the rack shaft 2. When the rack shaft 2 is at the final end position P of the stroke, the spacer 34 is held between the end surfaces 29 and 33, which are opposed to each other, of the stopper 25 and the housing section 26 of the ball joint 8. FIG. 3 is a cross-sectional view of the spacer 34, and FIG. 4 is an enlarged view in the vicinity of the spacer 34 shown in FIG. 1.

Figure 4:
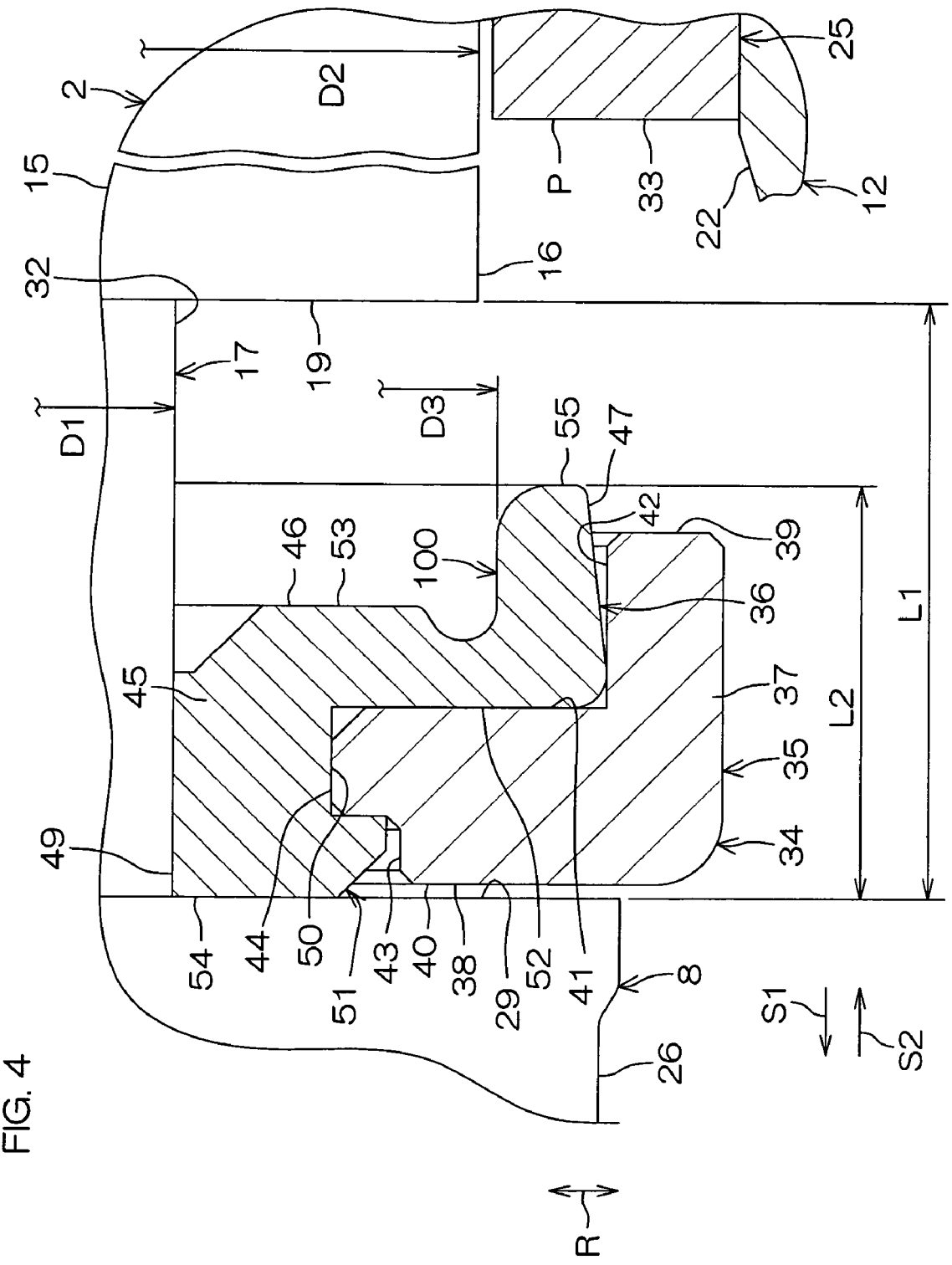
FIG. 4 is an enlarged view in the vicinity of the spacer shown in FIG. 1.

Referring to FIGS. 3 and 4, the spacer 34 comprises an annular metal member 35 and an annular elastic member 36. The metal member 35 comprises an annular section 37 arranged outside in the radial direction R against the elastic member 36, and an annular receiving plate 38 extended inward in the radial direction R from an end of the first axial direction S1 serving as an end, on the side of the joint, of the annular section 37.

Regarding the radial direction R, the annular section 37 is arranged outside of the main body section 15 in the rack shaft 2. A first abutment section 39 is formed on an end surface of the second axial direction S2 of the annular section 37. The first abutment section 39 of the annular section 37 is abuttable on the end surface 33 of the stopper 25 when the stopper 25 regulates the stroke amount of the rack shaft 2. The first abutment section 39 and the end surface 33 are brought into surface contact with each other when the rack shaft 2 is at the final end position P of the stroke.

Regarding the radial direction R, the receiving plate 38 extends into the main body section 15 in the rack shaft 2. The receiving plate 38 comprises a second abutment section 40 that is abuttable on the end surface 29 of the housing section 26 of the ball joint 8 and a receiving section 41 provided at an end of the second axial direction S2 on the opposite side of the second abutment section 40. The second abutment section 40 is provided on an end surface of the first axial direction S1 of the receiving plate 38, and is brought into surface contact with the end surface 29 of the housing section 26 of the ball joint 8. Movement in the first axial direction S1 of the metal member 35 is regulated by abutment of the second abutment section 40 and the end surface 29.

The receiving section 41 is provided on an end surface of the second axial direction S2 of the receiving plate 38. An annular projection 44 projecting inward in the radial direction R is provided in a half in the second axial direction S2 of an inner peripheral surface 43 of the receiving plate 38.

The elastic member 36 is formed of a resin material such as polyurethane, for example, and a hardness thereof is set to approximately 50 to 60 in terms of a D hardness in JIS (Japanese Industrial Standard) (a D hardness of 55 in the present embodiment). The elastic member 36 comprises an inner annular section 45 fitted in the outer peripheral surface 32 of the cylindrical section 17 of the rack shaft 2, an annular main body section 46 extended from the inner annular section 45 and received by the receiving section 41 of the receiving plate 38 of the metal member 35, and an outer annular section 100 extended from the annular main body section 46 and having its outer periphery surrounded by the annular section 37 of the metal member 35. The outer annular section 100 comprises a first projection section 47 which projects farther to the stopper 25 than the first abutment section 39 of the annular section 37 does, that is, projects in the second axial direction S2 when the stopper 25 does not regulate the stroke amount of the rack shaft 2.

Figure 5:
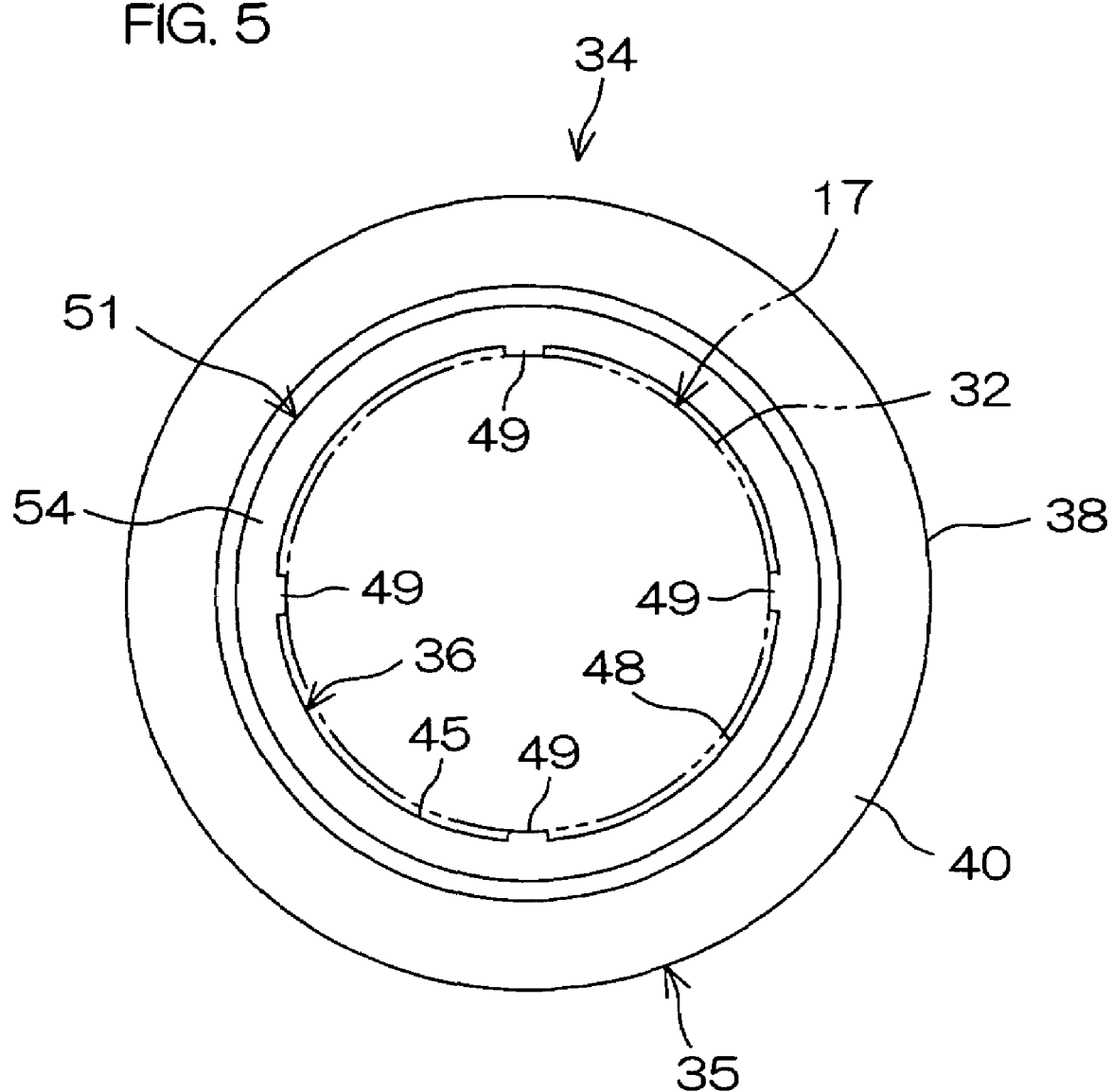
FIG. 5 is a side view of the spacer shown in FIG. 3 as viewed in a second axial direction.

FIG. 5 is a side view of the spacer 34 shown in FIG. 3 as viewed in the second axial direction S2. Referring to FIG. 5, a plurality of (four, for example) projections 49 that come into contact with the outer peripheral surface 32 of the cylindrical section 17 in the rack shaft 2 are provided equally distributed in the circumferential direction on the inner peripheral surface 48 of the inner annular section 45. This prevents the inner peripheral surface 48 of the inner annular section 45 from coming into contact with the whole periphery of the outer peripheral surface 32 of the cylindrical section 17. Consequently, a frictional resistance produced when the inner annular section 45 is fitted in the cylindrical section 17 of the rack shaft 2 can be significantly reduced, thereby making it possible to easily mount the spacer 34 on the rack shaft 2.

Referring to FIG. 4 again, regarding the first and second axial directions S1 and S2, the length L1 of the cylindrical section 17 of the rack shaft 2 is set to a value larger than the length of the spacer 34, that is, the length L2 of the elastic member 36 (L1>L2) and the spacer 34 is slidable in the first and second axial directions S1 and S2 on the cylindrical section 17.

The annular projection 44 of the receiving plate 38 of the metal member 35 is fitted in an annular groove 50 formed on an outer peripheral surface of the inner annular section 45. A second projection section 51 which projects farther to the housing section 26 of the ball joint 8, that is, in the first axial direction S1 than the second abutment section 40 of the receiving plate 38 of the metal member 35 does is provided at an end of the first axial direction S1 of the inner annular section 45. When an end surface 54 of the first axial direction S1 of the second projection section 51 is pressed against the end surface 29 of the housing section 26 of the ball joint 8 so that the elastic member 36 is compressed, the second abutment section 40 of the receiving plate 38 is abutted on the end surface An outer peripheral surface at the end in the first axial direction S1 of the inner annular section 45 is formed in a tapered shape to decrease in diameter radially inward in the first axial direction S1. Consequently, the inner annular section 45 is prevented from being damaged by meshed between the housing section 26 in the ball joint 8 and the receiving plate 38.

The annular main body section 46 is provided at an end, on the side of the stopper 25, of the inner annular section 45, that is, the end of the second axial direction S2, and extends outward in the radial direction R such that the diameter of the annular main body section 46 is larger than the vertical width D2 of the main body section 15 in the rack shaft 2. An end surface 52 of the first axial direction S1 of the annular main body section 46 is brought into surface contact with the receiving section 41 of the receiving plate 38, and an end surface 53 in the second axial direction S2 of the annular main body section 46 is opposed to the end surface 19 of the first axial direction S1 of the main body section 15 of the rack shaft 2 to be abuttable on the end surface 19.

An outer annular section 100 extends in the second axial direction S2 from an outer peripheral edge of the annular main body section 46, and the inner diameter D3 of the outer annular section 100 is set to a value larger than the vertical width D2 of the main body section 15 of the rack shaft 2 (D2<D3). The first projection section 47 of the outer annular section 100 projects in the second axial direction S2 farther than the first abutment section 39 of the annular section 37. An end surface 55 of the second axial direction S2 of the first projection section 47 is opposed to the end surface 33 of the stopper 25, and the end surface 55 and the end surface 33 are abuttable on each other.

An outer peripheral surface of the first projection section 47 is formed in a tapered shape to decrease in diameter radially inward from the first axial direction S1 to the second axial direction S2. Consequently, the first projection section 47 is prevented from being damaged by meshed between the stopper 25 and the annular section 37.

Figure 6:
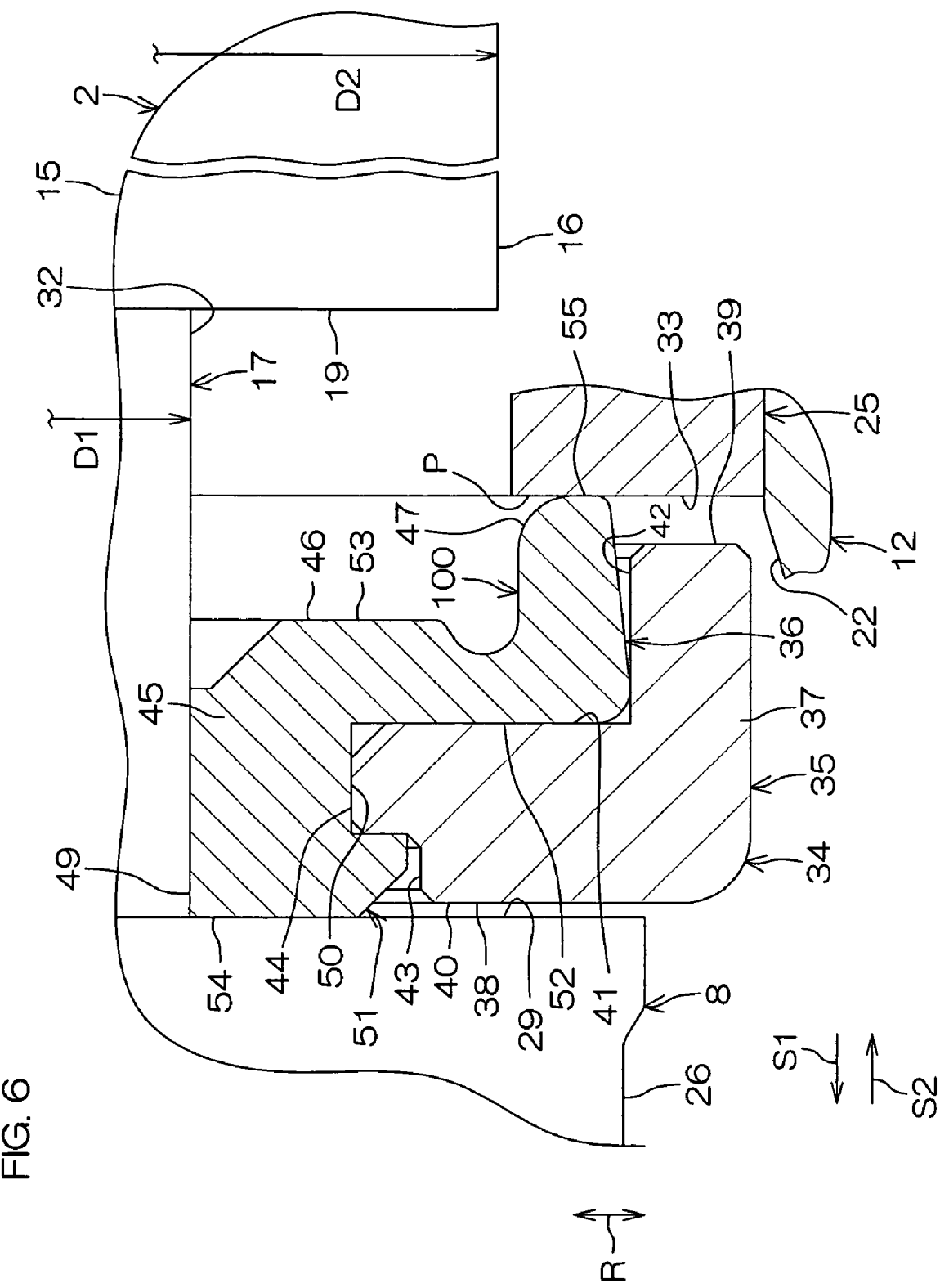
FIG. 6 is a figure showing a state where an elastic member of a spacer is abutted on a housing in a ball joint and a stopper.

Referring to FIG. 6, when the cylindrical section 17 of the rack shaft 2 is moved toward the final end position P of the stroke of the second axial direction S2 as the pinion 3 is rotated, the end surfaces 55 and 54 of the first and second projection sections 47 and 51 of the elastic member 36 of the spacer 34 are respectively abutted on the corresponding end surfaces 33 and 29 of the stopper 25 and the housing section 26 of the ball joint 8.

Figure 7:
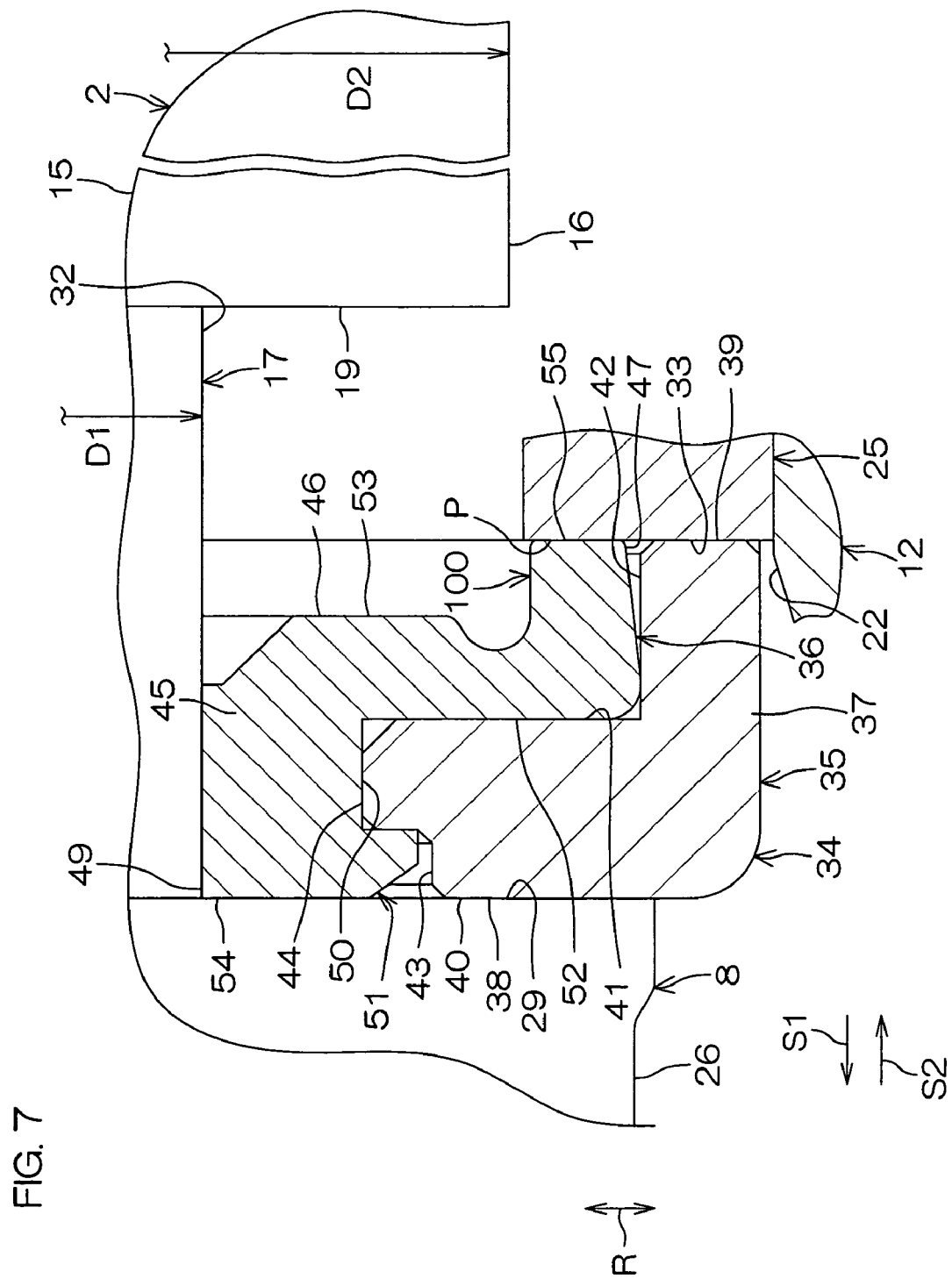
FIG. 7 is a figure showing a state where a metal member of a spacer is abutted on a housing of a ball joint and a stopper.

Referring to FIG. 7, when the rack shaft 2 is further moved in the second axial direction S2 to reach a final end position of the stroke, the elastic member 36 is axially compressed, so that the first and second abutment sections 39 and 40 of the metal member 35 are respectively abutted on the corresponding end surfaces 33 and 29 of the stopper 25 and the housing section 26 in the ball joint 8 and held between end surfaces 33 and 29, thereby regulating the movement of the rack shaft 2 in the second axial direction S2. When the stopper 25 regulates the stroke amount of the rack shaft 2, the outer annular section 100 of the elastic member 36 is received by the inner periphery of the metal member 35.

Thus according to the embodiment of the present invention, when the rack shaft 2 is thus moved to the final end position P of the stroke, the first projection section 47 in the elastic member 36 made of an elastic body is abutted on the end surface 33 of the stopper 25 before the first abutment section 39 in the metal member 35 is abutted on the end surface 33 of the stopper 25, to cushion a shock. At this time, the radially outward deformation of the first projection section 47 is restricted by the annular section 37 of the metal member 35. Therefore, a high buffering effect can be obtained by sufficiently compressing the first projection section 47 in the first axial direction X1. After such a high buffering effect is obtained, the first abutment section 39 is abutted on the end surface 33 of the stopper 25, it is possible to reliably restrain the production of a collision sound between metals. The degree at which the shock is cushioned can be easily adjusted only by changing the hardness of the elastic member 36, for example, by changing the material for the elastic member 36.

Furthermore, the elastic member 36 is elastically deformable. Thereby even if the spacer 34 is not previously assembled on the cylindrical section 17 of the rack shaft 2 with high precision, the spacer 34 can be prevented from being abutted on the stopper 25 with the spacer 34 is inclined toward the stopper 34. Consequently, time and labor required to enhance the assembling precision of the spacer 34 on the rack shaft 2 can be omitted, thereby making it possible to significantly reduce labor required for the assembling.

Moreover, the receiving plate 38 extended radically inward of the annular section 37 of the metal member 35 is provided with the second abutment section 40 to the housing section 26 of the ball joint 8, thereby making it possible to set the diameter of the second abutment section 40 to the ball joint 8 without being affected by the diameter of the first abutment section 39 to the stopper 25. As a result, the outer diameter of the housing section 26 of the ball joint 8 can be reduced, thereby making the housing section 26 compact.

Furthermore, the second projection section 51 is provided in the inner annular section 45 of the elastic member 36, so that the elastic member 36 is tightly abutted on the stopper 25 and the housing section 26 in the ball joint 8 before the metal member 35 is abutted on the stopper 25 and the housing section 26. Consequently, it is possible to prevent the abutment sections 39 and 40 of the metal member 35 from being abutted on partially the corresponding end surfaces 33 and 29, thereby when the spacer 34 is assembled on the rack shaft 2, the spacer 34 need not be strictly positioned against the end surfaces 29 and 30, making it possible to significantly reduce labor required for the assembling.

The spacer 34 can cushion a shock caused by the abutment between the spacer 34 and the housing section 26 of the ball joint 8 because the end surface 54 of the second projection section 51 is abutted on the end surface 29 of the housing section 26 of the ball joint 8 before the second abutment section 40 is abutted on the end surface 29.

Furthermore, the rack shaft 2 is provided with the main body section 15 that is in a Y shape in cross section, so that the width of the rack tooth section 13 of the rack shaft 2 can be sufficiently increased, thereby making it possible to transmit significantly large power by sufficiently increasing a portion where the tooth section 3 is meshed with the tooth section 18. Moreover, the inner annular section 45 of the elastic member 36 is only fitted of the cylindrical section 17 of the rack shaft 2, thereby making it possible to easily assemble the spacer 34 on the rack shaft 2.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

This application corresponds to Japanese Patent Application No. 2003-204948 filed with the Japanese Patent Office on Jul. 31, 2003, the disclosure thereof being incorporated herein by reference.

The invention claimed is:

1. A vehicle steering apparatus comprising:
   a rack shaft supported by a housing so as to be axially slidable;
   a joint for connecting an end of the rack shaft and an end of a tie rod; and
   a stopper for regulating a stroke amount of the rack shaft through a spacer,
   the stopper and the joint respectively comprising end surfaces opposed to each other,
   the spacer being held between the end surface of the stopper and the end surface of the joint when the rack shaft is at a final end position of the stroke,
   the spacer comprising an annular elastic member and an annular metal member,
   the elastic member comprising an inner annular section fitted in an outer periphery at the end of the rack shaft and an outer annular section,
   the metal member comprising an annular section surrounding an outer periphery of the outer annular section of the elastic member,
   the annular section of the metal member comprising a first abutment section that is abuttable on the end surface of the stopper when the stopper regulates the stroke amount of the rack shaft, and
   the outer annular section of the elastic member comprising a projection section which projects farther to the stopper than the first abutment section of the metal member does when the stopper does not regulate the stroke amount of the rack shaft.

2. The vehicle steering apparatus according to claim 1, wherein
   when the stopper regulates the stroke amount of the rack shaft, the outer annular section of the elastic member is received by an inner periphery of the annular section of the metal member.

3. The vehicle steering apparatus according to claim 1, wherein
   the metal member comprises an annular receiving plate extended radially inward from an end, on a side of the joint, of the annular section,
   the receiving plate comprises a second abutment section that is abuttable on the end surface of the joint and a receiving section provided on an opposite side of the second abutment section, and
   the elastic member comprises an annular main body section extended from the inner annular section and received by the receiving section.

4. The vehicle steering apparatus according to claim 3, wherein
   the inner annular section of the elastic member comprises a second projection section which projects farther to the joint than the second abutment section of the receiving plate of the metal member does.

5. The vehicle steering apparatus according to claim 1, wherein
   the rack shaft comprises a main body section that is in a Y shape in cross section,
   a cylindrical section is provided at an end of the main body section, and
   the inner annular section of the elastic member of the spacer is fitted in an outer peripheral surface of the cylindrical section.

6. The vehicle steering apparatus according to claim 5, wherein
   a rack tooth section is formed on a plane-shaped portion of the main body section of the rack shaft.

7. The vehicle steering apparatus according to claim 1, wherein
   the stopper is formed in an annular shape, through which the rack shaft is inserted, and is press-fitted in and fixed to an insertion hole formed in the housing.

8. The vehicle steering apparatus according to claim 1, wherein
   the joint comprises a ball joint.

9. The vehicle steering apparatus according to claim 8, wherein
   the ball joint comprises a housing section fixed to the end of the rack shaft, and
   a spherical section accommodated in the housing section and connected to the end of the tie rod,
   the end surface of the joint is provided at the housing section.

10. The vehicle steering apparatus according to claim 1, wherein
    the first abutment section and the end surface of the stopper are brought into surface contact with each other when the rack shaft is at the final end position of the stroke.

11. The vehicle steering apparatus according to claim 3, wherein
    the second abutment section of the receiving plate and the end surface of the joint are brought into surface contact with each other.

12. The vehicle steering apparatus according to claim 3, wherein the receiving section of the receiving plate and the main body section of the elastic member are brought into surface contact with each other.

13. The vehicle steering apparatus according to claim 1, wherein an inner peripheral surface of the metal member comprises an annular projection projecting inward along its radius, and an outer peripheral surface of the elastic member comprises an annular groove in which the annular projection is fitted.

14. The vehicle steering apparatus according to claim 1, wherein a plurality of projections are provided with equal spacing in a circumferential direction on an inner peripheral surface of the inner annular section, and the projections are brought into contact with the outer periphery at the end of the rack shaft.

15. The vehicle steering apparatus according to claim 5, wherein a cylindrical section of the rack shaft is formed longer than the spacer along the axis of the rack shaft, and the spacer is axially slidable on the end of the rack shaft.

16. The vehicle steering apparatus according to claim 1, wherein the outer peripheral surface of the projection section of the elastic member is formed in a tapered shape to decrease in diameter toward the stopper.

* * * * *